April 12, 1955  F. R. MARSHALL  2,705,903
ELECTRO-OPTICAL SHUTTERS
Filed July 7, 1949
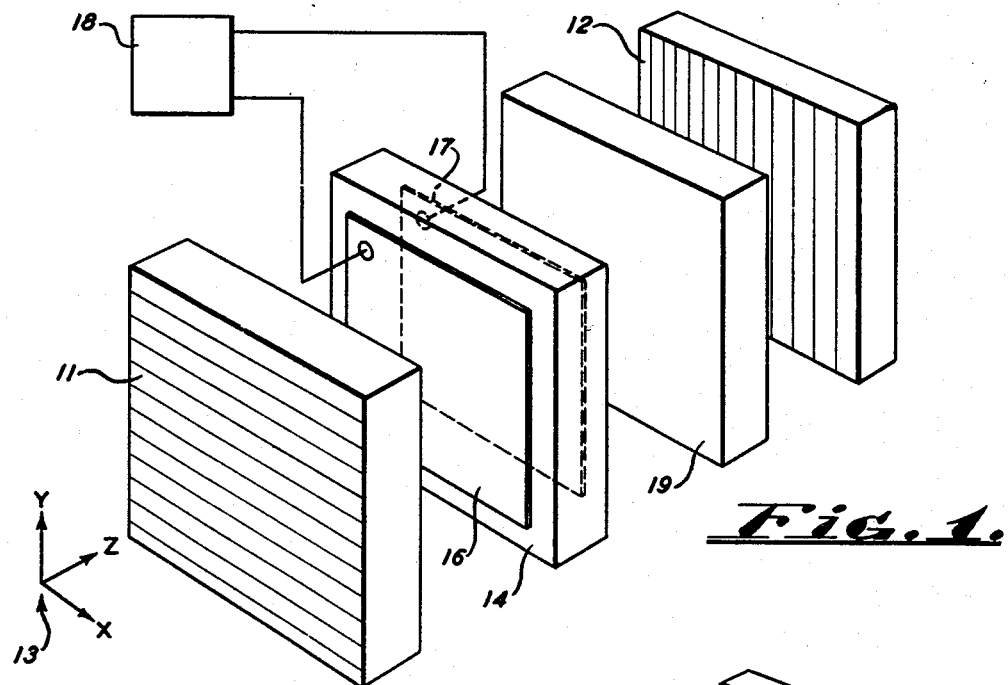
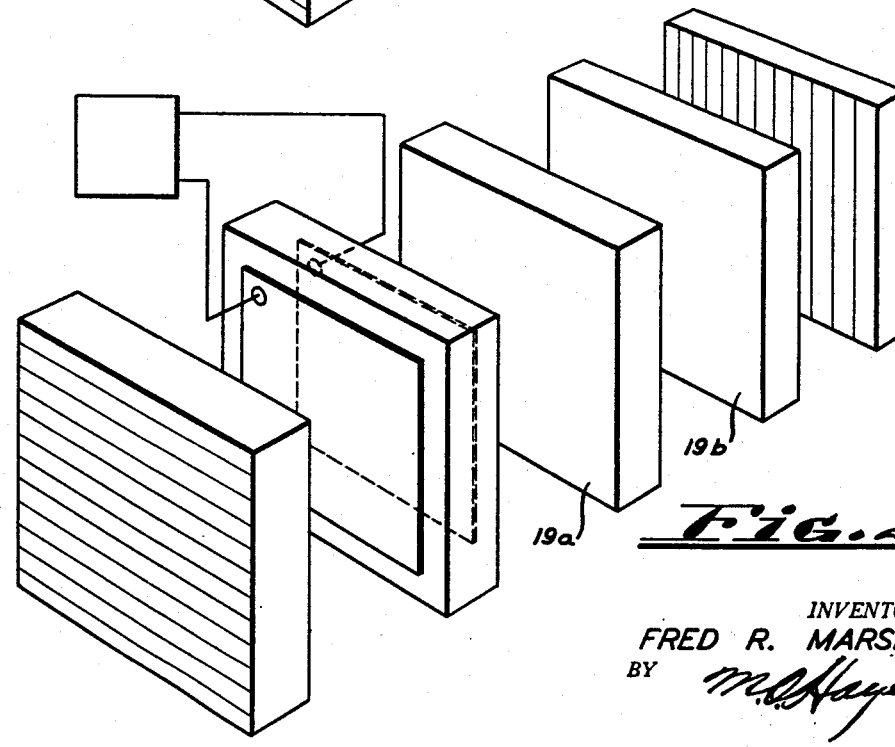
INVENTOR.
FRED R. MARSHALL
BY
ATTORNEY

United States Patent Office 2,705,903
Patented Apr. 12, 1955

2,705,903

ELECTRO-OPTICAL SHUTTERS

Fred R. Marshall, Arcadia, Calif.

Application July 7, 1949, Serial No. 103,503

6 Claims. (Cl. 88—61)

(Granted under Title 35, U. S. Code (1952), sec. 266)

This invention relates to optical systems, and more particularly to optical systems employing a light valve in the form of a birefringent crystal.

It is an object of this invention to provide light valve means in an optical system which are totally or partially free of deleterious effects for light passing thru the light valve at inclined angles.

It is another object of this invention to apply a correction to an optical system so that a light valve crystal may be employed to advantage over a greater angular region.

It is a further object of this invention to provide means for correcting "retardation circles" in a birefringent crystal.

It is a further object of this invention to provide a correction, not only of retardation effects, but also for dispersion in retardation, i. e. for varying retardations with different wave lengths.

Other objects and many of the attendant advantages of this invention will be readily appreciated as the same becomes better understood by reference to the following description, when taken in connection with the accompanying drawings, in which:

Fig. 1 is a diagrammatic showing of the improved electro-optical shutter of this invention, and Fig. 2 is a modification of the invention showing a plurality of corrector crystals.

The instant invention comprises an optical system including aligned, crossed polarizers having disposed therebetween, along the optic axis of the system, a light valve in the form of a birefringent crystal. As is well-known, the crossed polarizers block passage of light. However, should an electric field be applied to the intermediate, birefringent crystal, the crystal causes a change in the polarization of the light passing through it, and the net effect is that light passes through the optic system.

Unfortunately, in the unstressed condition of the crystal, i. e. with no electric field present, blocking of light is effected only within a relatively narrow angle surrounding the refracted optic axis of the crystal. The retardation characteristics of the birefringent crystal, whether positive or negative, result in opacity only at the refracted optic axis of the crystal; the light pattern viewed through the optic system with the crystal unstressed consists of a series of concentric light and dark circles on which is superimposed a dark cross. This phenomenon is fully explained in the prior art, an example of which is "Physical Optics" by Robert W. Wood, published 1911 by MacMillan, third edition, pages 383 and 384.

It is thus seen that the light valve, or birefringent crystal, instead of completely blocking the beam of light, as one would like to have it do with the crystal unstressed, permits a series of coaxial cones of light to pass through; this of course would render the system virtually valueless as a photographic light valve means.

In accordance with the instant invention, certain additional birefringent crystal means are also disposed between the polarizers, this second, or corrector, crystal means having a retardation characteristic which is substantially complementary, i. e. equal in magnitude and opposite in polarity or sign, to that of the light valve. By the employment of more than one crystal, the correction may be successively improved, as will be pointed out particularly hereinafter. The effect of the corrector crystal or crystals is to broaden the dark or opaque angular region around the refracted optic axis, which exists when the light valve crystal is unstressed, thereby enlarging the useful angular region of the optical system.

In order to stress the light valve crystal so that light may be selectively permitted to pass through the optic system, electrodes are disposed adjacent the light valve, or shutter, crystal so as to embrace the same, and suitable voltage means are connected for selectively applying an electric field to the shutter crystal by means of the electrodes. It is preferred to make both the shutter crystal and the corrector crystal in the form of generally flat plates, disposed transversely across the optic axis of the system. In this case it is convenient to make the electrodes of transparent material, and place them on opposite faces of the shutter crystal or plate.

For a detailed explanation of the instant invention, reference is now made to Fig. 1, wherein 11 and 12 designate crossed polarizer plates, disposed transversely of a predetermined optic axis system. As shown by the coordinate axis diagram 13, plates 11 and 12 are disposed in what will be called the XY plane, while the Z axis is congruent with the optic axis of the system. As is well-known in the prior art, the crossed polarizers block transmission of light along the optic axis Z.

When a birefringent crystal plate 14 is disposed transversely across the optic axis between the polarizers 11 and 12, with its optic axis congruent with that of the system, the light pattern passing along the optic axis through the system assumes the form of a series of concentric light and dark circles with a dark spot in the center. Should the crystal plate 14 be stressed by an electric field, through the agency of electrodes 16 and 17 embracing the plate 14 and energized from a source of voltage 18, the polarization of the light passing through the plate 14 will be altered, so that the dark central spot becomes light. It is thus seen that the application of an electric field to the crystal plate 14 has the effect of controlling the passage of light through the optic system, and for this reason the crystal 14 may be referred to as the light valve, or shutter, crystal of the system.

As shown in Fig. 1, it is preferred to dispose the electrodes 16 and 17 against the two faces of the light valve crystal 14, and since they are thus athwart the optic axis of the system, it is necessary that they be made of a substantially transparent material. Such transparent electrodes may be formed by using the teaching in Patent 2,429,420, McMaster.

As explained in "Physical Optics," referenced above, the retardation introduced by the crystal 14 produces progressive phase difference of the emergent wave component with varying angles of incidence of the light, and this in turn causes the concentric light and dark circles seen through the system. In accordance with the instant invention there is provided a corrector plate 19, which is a uni-axial, birefringent crystal plate having a retardation characteristic which is complementary, i. e. of equal magnitude and opposite sign or polarity, to the retardation characteristic of the light valve crystal 14. The net effect of the introduction of the plate crystal 19 is to extinguish the concentric circles originally seen through the optic system, and at least for small angles, up to approximately 10°, produce substantially complete opacity of the optic system, when the crystal 14 is unstressed. When the crystal 14 is stressed by an electric field, the opaque region becomes transparent. The introduction of the corrector crystal 19 into the system thus greatly enlarges the useful angular region of the optic system.

The optic axis of the corrector crystal 19 must be disposed parallel to the optic axis of the light valve crystal 14. That is to say, if the plate 14 is cut so that its optic axis lies along the X axis of the system, as shown at 13, then the plate 19 must also be so cut. The manner in which a corrector plate 19 of retardation characteristic complementary to that of crystal 14 may be selected will now be discussed. Assume that crystal 14 is a Z-cut plate of a uni-axially birefringent crystal. That is to say, the plane of the plate 14 (XY plane) is normal to the optic axis of the crystal from which the plate 14 is cut. In this event, the plate 19 is also chosen to be a Z-cut plate. A plane wave of plane polarized light incident upon a crystal plate is in general propagated through the crystal as two waves with different velocities and wave normals.

If the surfaces of the crystal plate are parallel, the emergent waves are parallel to each other and to the incident wave, but because the two waves traversed the crystal with different velocities and along different paths, one wave will be displaced with respect to the other. Since the displacement between two parallel plane waves has meaning only if the displacement is normal to the plane of the waves, i. e., in the direction of propagation, this displacement is usually referred to as retardation. Because of the retardation, the composite emergent wave will possess an altered state of polarization. It is this altered state of polarization which accounts for the light rings or circles seen through the optical system without the corrector plate 19, and when the light valve crystal 14 is unstressed. When the retardation is an integral number of wave lengths, there is no alteration and the dark circles result.

For a crystal plate cut perpendicular to the Z-axis of a uni-axial crystal, the entire optical system has axial symmetry about the optic axis (and normal to the plate). The retardation can therefore be given in terms of the angle of incidence, i. e. the angle that the wave normal makes with the normal to the surface of the plate.

In a uni-axial crystal, the two transmitted waves are called ordinary and extraordinary. The polarization of the waves with respect to the geometry of the system is as follows: the electric vector of the ordinary wave is perpendicular to the plane containing the wave normal and the plate normal. The electric vector of the extraordinary wave lies in the plane containing the wave normal and the plate normal.

An expression for the retardation introduced by a Z-cut plate of the uni-axial crystal can be found in textbooks on optics as follows:

$$\delta = dn_o \left\{ \left(1 - \frac{\sin^2 \phi}{n_o^2}\right)^{1/2} - \left(1 - \frac{\sin^2 \phi}{n_e^2}\right)^{1/2} \right\} \quad (1)$$

where:

$\delta$ = retardation, in units of length, or the ordinary wave with respect to the extraordinary wave.
$n_o$ = ordinary index of refraction.
$n_e$ = extraordinary index of refraction.
$d$ = thickness of crystal plate.
$\phi$ = angle of incidence.

If we let unprimed quantities represent the original plate, and primed quantities the corrector plate, the condition for no net retardation is:

$$\delta + \delta' = 0 \quad (2)$$

By inspection of the above expression, the requisite conditions are:

$$\begin{array}{l} n_o = n_e' \\ n_e = n_o' \\ dn_o = d'n'_o \end{array} \quad (3)$$

Either of the first two conditions would be satisfied only by chance, since the number of crystalline substances is finite and the possible values of refractive index are infinite in number. Simultaneous satisfaction of both of the first two conditions is still more unlikely.

Having thus shown that exact correction of the retardation in plate 14 by the use of the corrector plate 19 is possible only for rare and unique conditions, it is seen that a practical approach to the problem must involve an approximate correction. This may be solved as follows:

Expanding the expression for retardation in a power series in sin $\phi$:

$$\delta = d(\sin^2 \phi) \frac{n_o}{2}\left(\frac{1}{n_e^2} - \frac{1}{n_o^2}\right) + d(\sin^4 \phi) \frac{n_o}{8}\left(\frac{1}{n_e^4} - \frac{1}{n_o^4}\right) +$$
$$d(\sin^6 \phi) \frac{n_o}{16}\left(\frac{1}{n_e^6} - \frac{1}{n_o^6}\right) + \cdots \quad (4)$$

For simplicity, this can be written:

$$\delta = d(\sin^2 \phi)A + d(\sin^4 \phi)B + d(\sin^6 \phi)C + \cdots \quad (5)$$

where A, B, C, etc. are characteristics of the particular crystalline material given by the relations:

$$A = \frac{n_o}{2}\left(\frac{1}{n_e^2} - \frac{1}{n_o^2}\right)$$

$$B = \frac{n_o}{8}\left(\frac{1}{n_e^4} - \frac{1}{n_o^4}\right) \quad (6)$$

$$C = \frac{n_o}{16}\left(\frac{1}{n_e^6} - \frac{1}{n_o^6}\right)$$

etc.

The condition for zero net retardation using one corrector plate 19 is: $\delta + \delta' = 0$.

This can be approximately satisfied at small angles of incidence ($\sin^2 \phi \ll 1$) if:

$$dA + d'A' = 0 \quad (7)$$

$$d' = -d\frac{A}{A'} = -d\frac{n_o}{n_o'}\frac{\frac{1}{n_e^2} - \frac{1}{n_o^2}}{\frac{1}{n_e'^2} - \frac{1}{n_o'^2}} \quad (8)$$

It can be readily seen that Equation 8 immediately above produces real (i. e. positive) values for the thickness of the corrector plate only if the crystal from which the corrector plate is cut is of polarity opposite from that of the light valve crystal 14.

In crystal terminology, a uni-axial crystal is positive if $n_e$ is greater than $n_o$, and negative if $n_o$ is greater than $n_e$.

To illustrate selection of a corrector crystal 19 in accordance with the above outlined principles, assume that the light valve crystal 14 is a crystal plate of ammonium dihydrogen phosphate one millimeter thick. This crystal has $n_o$ equal to 1.525, and $n_e$ equal to 1.480. Assume further that a corrector plate of rutile is chosen. This material has an $n_o'$ of 2.616 and an $n_e'$ of 2.903. The thickness $d'$ of the rutile corrector plate 19 should, from Equation 8, be chosen to be 0.563 millimeter.

Improved correction at greater angles of incidence than possible with a single corrector plate 19 may be attained by the use of a plurality of corrector plates, as shown in Fig. 2. In this figure, two corrector plates 19a and 19b are employed, although it will be understood that for some circumstances, three or more corrector plates may be desirable. By thus using a plurality of corrector plate crystals, not only can improved correction at greater incidence angles be obtained, but the correction of retardation can be made more nearly achromatic, i. e. a dispersion in retardation characteristic can be introduced which is complementary to the dispersion in retardation characteristic of the light valve crystal 14.

Consider the use of two corrector plates.

$$\delta + \delta' + \delta'' = 0 \quad (9)$$

Approximating the deltas ($\delta$) by two terms of Equation 5, $$d(\sin^2\phi)A + d(\sin^4\phi)B + d'(\sin^2\phi)A' + d'(\sin^4\phi)B'$$
$$+ d''(\sin^2\phi)A'' + d''(\sin^4\phi)B'' = 0 \quad (10)$$

If the equation is true for all values of sin $\phi$, then the coefficients of all powers of sin $\phi$ must separately be zero.

$$dA + d'A' + d''A'' = 0 \quad (11a)$$
$$dB + d'B' + d''B'' = 0 \quad (11b)$$

These equations, solved for the thickness of the two corrector plates, give:

$$d' = -d\frac{\begin{vmatrix} A & A'' \\ B & B'' \end{vmatrix}}{\begin{vmatrix} A' & A'' \\ B' & B'' \end{vmatrix}} \quad (12)$$

$$d'' = -d\frac{\begin{vmatrix} A' & A \\ B' & B \end{vmatrix}}{\begin{vmatrix} A' & A'' \\ B' & B'' \end{vmatrix}} \quad (13)$$

It can easily be seen from Equation 11a that at least one of the corrector plates must be of opposite polarity to the original plate.

Achromatic correction of retardation may be achieved by a plurality of corrector plates, by so selecting the corrector crystals with the total dispersion in retardation characteristic of the totality of the several corrector crystals is substantially equal in magnitude and opposite in sign to the total dispersion in retardation characteristic of the light valve crystal 14.

If exact compensation of retardation is accomplished at two wave lengths, approximate compensation will prevail over a wide spectrum. Let subscript "$a$" denote the properties at wave length "$a$," and subscript "$b$" the properties at wave length "$b$." The condition for correction of retardation at two wave lengths by the use of two corrector plates 19$a$ and 19$b$ are:

$$\delta_a + \delta_a' + \delta_a'' = 0$$
$$\delta_b + \delta_b' + \delta_b'' = 0 \quad (14)$$

Writing the small angle approximation for (14):

$$(\sin^2\phi)[A_a d + A_a' d' + A_a'' d''] = 0$$
$$(\sin^2\phi)[A_b d + A_b' d' + A_b'' d''] = 0 \quad (15)$$

from which it follows that:

$$d' = -d \frac{\begin{vmatrix} A_a & A_a'' \\ A_b & A_b'' \end{vmatrix}}{\begin{vmatrix} A_a' & A_a'' \\ A_b' & A_b'' \end{vmatrix}} \quad (16)$$

$$d'' = -d \frac{\begin{vmatrix} A_a' & A_a \\ A_b' & A_b \end{vmatrix}}{\begin{vmatrix} A_a' & A_a'' \\ A_b' & A_b'' \end{vmatrix}} \quad (17)$$

Here, too, at least one of the corrector plates must be of opposite polarity to that of the light valve crystal 14.

By appropriate choice of parameters, a plurality of corrector plates may be used to correct simultaneously for chromatic and angular effects. That is to say, through the use of a plurality of corrector plate crystals, the total retardation characteristic and the total dispersion in retardation characteristic of the corrector crystals may be made substantially equal in magnitude and opposite in sign to the corresponding characteristics of the light valve crystal.

Obviously, many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In an optical shutter of the type wherein the light blocking functions are performed by a pair of crossed polarizers, a shutter opener comprising a transparent, uniaxial negative, electro-optically active, Z-cut crystal positioned between said polarizers and effective when stressed by an electric field to cause a change in the polarization of light passing therethrough, means to apply an electric field to said electro-optically active crystal, and a transparent, uniaxial positive, Z-cut, compensator crystal having its optic axis congruent with the optic axis of and a retardation characteristic substantially equal to that of said uniaxial negative crystal and positioned between said polarizers effective to block substantially all light from passing through said shutter over a field of view including angles up to about 10° from normal incidence when said electro-optically active crystal is in an unstressed condition.

2. In a light shutter of the type wherein between a pair of crossed polarizers a transparent, electro-optically active, Z-cut, uniaxial negative crystal is disposed effective to permit the passage of light through the shutter when said crystal is stressed by an electric field and to permit the passage of light in a restricted pattern when said crystal is unstressed, the improvement comprising at least one transparent, Z-cut, uniaxial positive crystal disposed between said electro-optically active crystal and one of said polarizers whereby the opaque portion of the pattern formed by the passage of light through said shutter when the electro-optically active crystal is in an unstressed condition is expanded.

3. In a light shutter of the type wherein between a pair of crossed polarizers a transparent, electro-optically active, Z-cut, uniaxial positive crystal is disposed effective to permit the passage of light through the shutter when said crystal is stressed by an electric field and to permit the passage of light in a restricted pattern when said crystal is unstressed, the improvement comprising at least one transparent, Z-cut, uniaxial negative crystal disposed between said electro-optically active crystal and one of said polarizers whereby the opaque portion of the pattern formed by the passage of light through said shutter when the electro-optically active crystal is in an unstressed condition is expanded.

4. In a light shutter of the type wherein between a pair of crossed polarizers a Z-cut ammonium dihydrogen phosphate plate is disposed effective to permit the passage of light through the shutter when said plate is stressed by an electric field and to permit the passage of light in a restricted pattern when said plate is unstressed, the improvement comprising a Z-cut rutile plate disposed between said ammonium dihydrogen phosphate plate and one of said polarizers whereby the opaque portion of the pattern formed by the passage of light through said shutter when the ammonium dihydrogen phosphate plate is in an unstressed condition is expanded.

5. In a shutter having crossed polarizers and a Z-cut ammonium dihydrogen phosphate electro-optical element disposed therebetween, an improvement for increasing the useful field of view of said shutter comprising a Z-cut rutile plate disposed in the light path between the polarizers and having a retardation characteristic substantially equal in magnitude but of opposite polarity with respect to the retardation characteristic of the electro-optical element.

6. In an optical shutter, a series of flat, light transparent plates in optical alignment having major sides normal to the light path through the shutter including in sequence a first polarizing plate, a substantially uniaxial, electro-optically active, Z-cut, crystal plate of predetermined optical polarity, a pair of electrodes disposed adjacent opposing major sides of said electro-optically active crystal plate, means for applying a voltage to said electrodes, a substantially uniaxial, Z-cut, crystal plate of an optical polarity opposite that of said electro-optically active crystal plate, and a second polarizing plate having the polarizing axis at right angles to the polarizing axis of said first polarizing plate.

References Cited in the file of this patent

UNITED STATES PATENTS

| Number | Name | Date |
| --- | --- | --- |
| 1,792,752 | Michelssen | Feb. 17, 1931 |
| 1,926,716 | Ehringhaus | Sept. 12, 1933 |
| 2,237,565 | Land | Apr. 8, 1941 |
| 2,420,273 | West | May 6, 1947 |
| 2,441,049 | West | May 4, 1948 |
| 2,467,325 | Mason | Apr. 12, 1949 |
| 2,607,272 | Bond | Aug. 19, 1952 |
| 2,616,962 | Jaffe | Nov. 4, 1952 |

FOREIGN PATENTS

| Number | Country | Date |
| --- | --- | --- |
| 268,348 | Great Britain | June 9, 1927 |